July 11, 1967  J. J. FESCO  3,330,099
VACUUM CLEANER FILTER BAG
Filed July 1, 1963  2 Sheets-Sheet 1
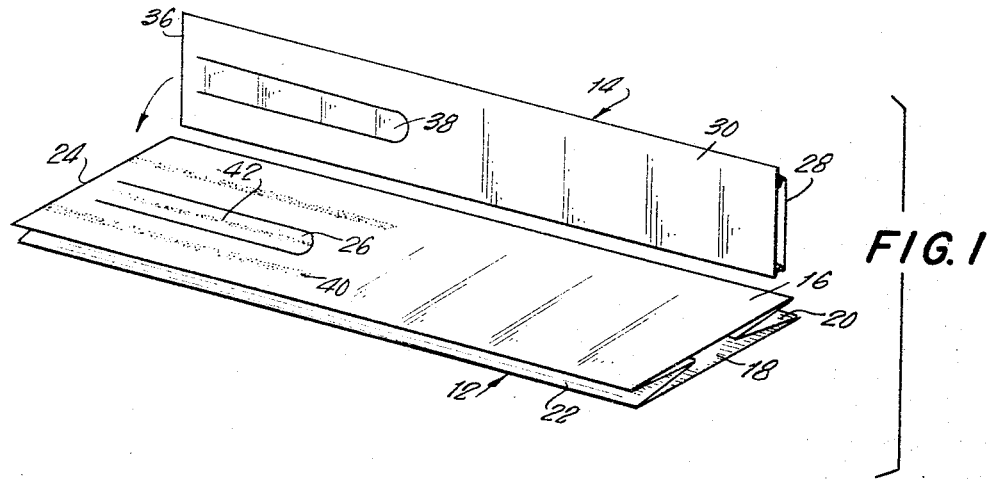
FIG. 1
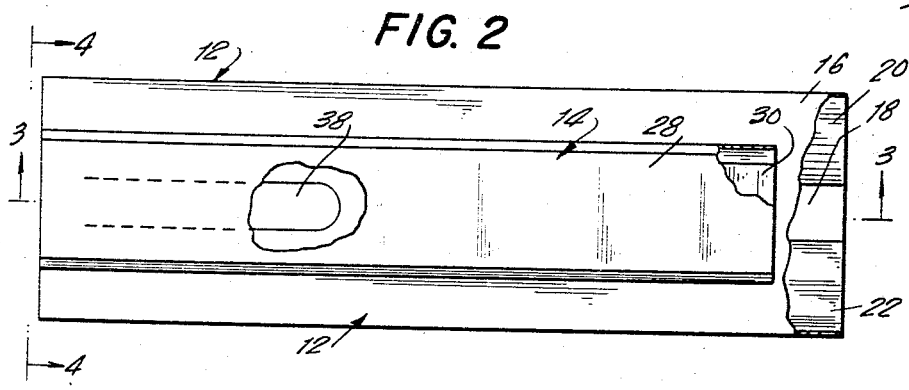
FIG. 2
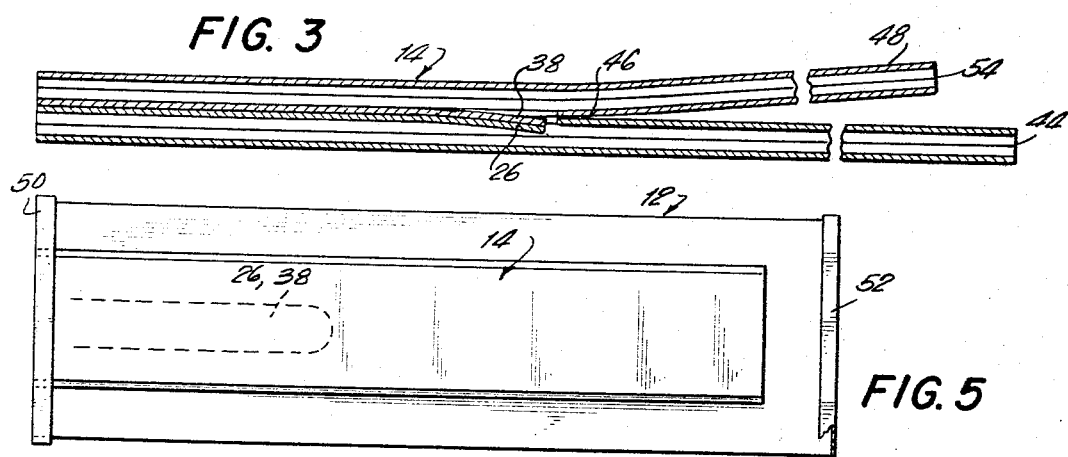
FIG. 3
FIG. 5
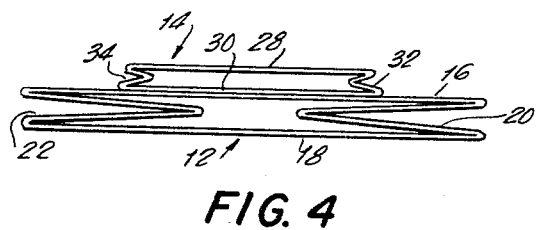
FIG. 4
INVENTOR.
JOHN J. FESCO
BY
Friedman & Goodman
ATTORNEYS July 11, 1967  J. J. FESCO  3,330,099
VACUUM CLEANER FILTER BAG
Filed July 1, 1963  2 Sheets-Sheet 2

INVENTOR.
JOHN J. FESCO
BY
Friedman & Goodman
ATTORNEYS

United States Patent Office 3,330,099
Patented July 11, 1967

3,330,099
VACUUM CLEANER FILTER BAG
John J. Fesco, Baldwin, N.Y., assignor to Studley Paper Company, Inc., a corporation of New York
Filed July 1, 1963, Ser. No. 291,657
4 Claims. (Cl. 55—367)

The present invention relates to an improved filter bag for a vacuum cleaner.

Vacuum cleaner filter bags of the type to which the present invention relates are formed of air permeable filter paper. During the use of the vacuum cleaner, it is highly desirable that the dirt and dust particles drawn into the vacuum cleaner be deposited at the bottom of the filter bag. As the dirt accumulates in the bottom of the bag it is important that the upper part of the bag remain free of dirt so that the air can continue to flow through the top of the bag and outwardly therefrom without interference by the accumulation of dirt in the bottom of the bag and without causing the dirt to move from the bottom of the bag to the top of the bag where the dirt could possibly interfere wth the air flow through the bag.

Accordingly, it is an object of the present invention to provide a filter bag wherein the dirt drawn into the bag will tend to drop to the bottom of the bag so as to leave a free air space in the upper portion of the bag free of dirt which is utilized for the flow of air through the bag.

It is another object of the present invention to provide a highly novel and efficient filter bag for a vacuum cleaner which can be manufactured at a relatively low cost utilizing automatic machinery and which can be sold at a relatively low price.

It is another object of the present invention to provide a deflector means in a vacuum cleaner filter bag which serves to deflect the dirt and dust drawn into the bag to the bottom of the bag and which serves also as a valve to close the bag when the vacuum cleaner is not in operation.

Other and further objects and advantages of the present invention will be readily apparent to one skilled in the art from a consideration of the following specification taken in connection with the appended drawings which illustrate the best mode presently contemplated for carrying out the invention.

In the drawings:

FIGURE 1 is a perspective view of a pair of blanks utilized to form the vacuum cleaner filter bag pursuant to the present invention, the blanks being shown during an intermediate step in the manufacture of the filter bag;

FIGURE 2 is a top plan view of the blanks shown in FIGURE 1, the blanks being disposed in assembled relation and illustrating another intermediate step during the formation of the filter bag of the present invention;

FIGURE 3 is a sectional view on an enlarged scale taken on the line 3—3 of FIGURE 2;

FIGURE 4 is an end view on an enlarged scale taken on the line 4—4 of FIGURE 2;

FIGURE 5 is a top plan view of a filter bag pursuant to the present invention;

Figure 6:
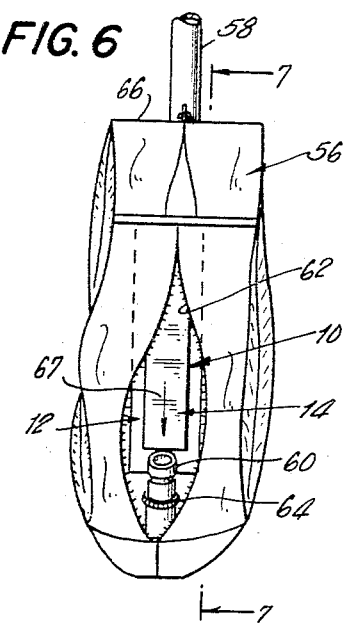
FIGURE 6 is a view illustrating the mounting or placement of the bag pursuant to the present invention in a vacuum cleaner.

Referring now to the drawings in detail, there is shown a vacuum cleaner filter bag 10 pursuant to the present invention. The bag 10 is of the discardable type and is preferably formed of suitable air permeable paper. The bag 10 is capable of being readily fabricated in an automatic paper making machine of a standard type and comprises merely two substantially rectangular blanks of paper or the like, the larger blank being folded and pasted to constitute a main subdivision 12 of the bag 10 and the smaller blank being folded and pasted to constitute a minor sub-division or tunnel 14. The main sub-division or body 12 is folded in the form of a substantially rectangular tubular member having the opposing face walls 16 and 18 and the pleated side walls 20 and 22. Pursuant to the present invention, the face wall 16 is provided adjacent the marginal edge 24 thereof, said edge constituting the upper marginal edge of the main body or subdivision 12, with a tongue or flap 26 which is integral with the face 16 adjacent said upper marginal edge 24 thereof.

The tunnel 14 is formed substantially in the same manner as the main subdivision 12 being substantially the same length as the main subdivision 12 but being narrower than the latter. As here shown, the tunnel 14 is provided with the opposing face walls 28 and 30 and with the pleated side walls 32 and 34. The face wall 30 is provided adjacent the upper marginal edge 36 thereof with a flap or tongue 38 which is similar in dimensions to the tongue 26 in the face wall 16 of the main body 12. The tongue or flap 38 is integral with the face wall 30 adjacent to the upper edge thereof. It will be apparent that the tongues 26 and 38 may be formed by conventional bag making machinery during the formation of the blanks from which the main subdivision 12 and the tunnel 14 are thereafter fabricated by a suitable folding and pasting operation.

After the main bag body 12 and the tunnel 14 are formed, the tunnel 14 is superimposed upon the main bag body 12 so that the face 30 of the tunnel is in abutment with the face 16 of the main bag sub-division and the tongue 38 is superimposed upon the tongue 26. Before the tunnel is superimposed on the main bag body, the latter is provided with the adhesive stripes 40 straddling the tongue 26 on the face 16 and with the adhesive stripe 42 along the tongue 26. It will be noted from FIGURE 1 that the adhesive stripes 40 terminate close to the free end of the tongue 26 and do not extend sufficiently toward the end of the face 16 opposite the marginal edge 24 to be engaged by the entire length of face 30. When the face 30 is urged against the face 16 it will be apparent that the face 30 will be secured to the face 16 along the adhesive stripes 40 and that the tongue 38 will be secured to the tongue 26 along the adhesive stripe 42. From the foregoing it will be apparent that the tunnel 14 is unsecured to the main body portion 12 from the marginal edge 44 of the latter to a point 46 which is immediately below the ends of the secured flaps or tongues 26 and 38 as best shown in FIGURE 3. Consequently, it will be apparent that the lower part 48 of the tunnel 14 is movable or bendable relative to the main bag body 12. The bag is completed by turning over the upper marginal edges 24 and 36 of the superimposed tunnel and bag body to form the end closure 50 at the upper end of the bag 10. Similarly, the lower marginal edge 44 of the bag body 12 is itself folded over upon itself to form the bottom end closure 52 it being noted therefore that the tunnel is open at its end 54 as best seen in FIGURE 3.

Figure 7:
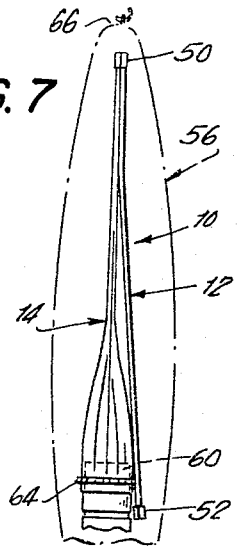
FIGURE 7 is a view taken on the line 7—7 of FIGURE 6.
Figure 8:
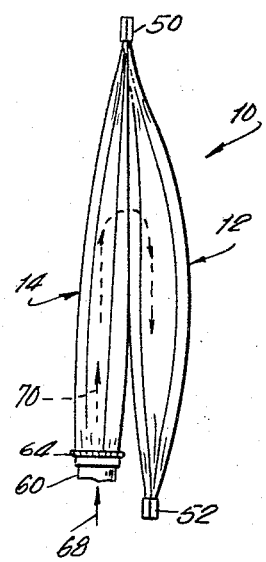
FIGURE 8 is a view similar to FIGURE 7 and illustrates the bag inflated by air flow therethrough.
Figure 9:
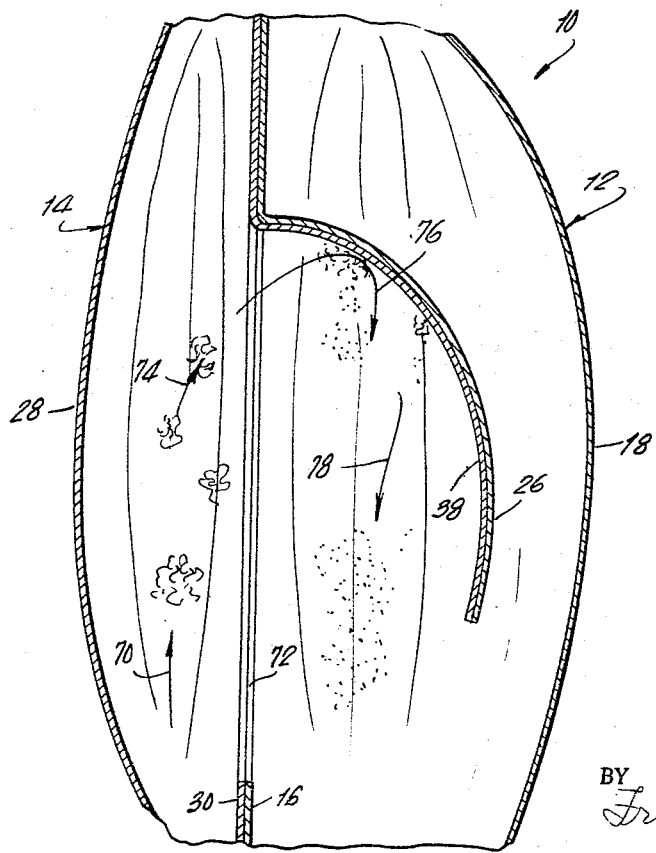
FIGURE 9 is a fragmentary longitudinal sectional view through a filter bag pursuant to the present invention and illustrates the condition of the bag with air flow therethrough.

Referring now to FIGURE 7 in detail, there is shown a conventional cloth bag 56 of a vacuum cleaner which is provided with an air inlet or suction conduit 58. The air inlet conduit 58 is provided at its lower end within the bag 56 with a sleeve or fitting 60 by means of which the filter bag 10 may be mounted in position within the cloth bag 56. In this connection, it will be noted that the cloth bag 56 is provided with a conventional slide fastener 62 by means of which it can be opened for the insertion or removal of the filter bag 10. The fitting 60 is provided with a spring securing ring 64 of conventional construction. In order to mount the filter bag 10 within the cloth bag 56 of the vacuum cleaner, the slide fastener 62 is moved to its open posiiton and the filter bag 10 is then inserted within the bag 56 so that the end closure 50 at the upper end of the bag 10 underlies the upper end 66 of the vacuum cleaner bag 56 and the open end 54 of the tunnel 14 is disposed immediately above the fitting 60. The tunnel is then manipulated downwardly as indicated by the arrow 67 so as to insert the fitting 60 within the open end or entrance 54 of the tunnel as best shown in FIGURE 7. The securing ring 64 is then disposed about the entrance of the tunnel 14 immediately above the open end 54 thereof as shown in FIGURE 7 so as to couple the fitting 60 to the entrance of the tunnel 14. Thereafter when the vacuum cleaner is operated dust and dirt laden air will flow through the conduit 58 as indicated by the arrow 68 in FIGURE 8 and into the tunnel 14 as illustrated by the arrow 70. As best shown in FIGURE 9, the air flowing into the tunnel 14 as indicated by the arrow 70 will strike the secured tongues 26 and 38 which normally are disposed within the planes of the respective walls 16 and 30 so as to move outwardly from the planes of the respective face walls to the position thereof shown in FIGURE 9. The displacement of the tongues 26 and 38 results in the formation of an opening 72 which is between the tunnel 14 and the main body 12 of the bag so that the air laden with dust and dirt can flow through the opening 72 from the tunnel 14 into the main bag body 12 as indicated by the arrow 74. However, it will be noted that the flaps 26 and 30 are disposed in the path of air flow through the opening 72 so as to constitute a deflector for the dust particles. Consequently, the dust particles in the air will strike the deflector 26–38 as indicated by the arrow 76 so as to fall toward the bottom of the bag as indicated by the arrow 78. Consequently, the dust and dirt accumulates at the bottom of the bag and does not flow up toward the top of the bag as would be the case if the deflector 26–38 was not disposed as in FIGURE 9. Consequently, when the operation of the vacuum cleaner is discontinued, the dust remains settled at the bottom of the bag. It will be readily apparent that upon discontinuation of the operation of the vacuum cleaner, the flexible deflector 26–38 will return to its original position in the plane of the respective face walls 30 and 16 so as to close the opening 72. Consequently, it will be apparent that the deflector 26–38 also functions as a valve to normally close the opening 72 when the vacuum cleaner is inoperative and to move away from the opening 72 so as to open the passageway from the tunnel 14 into the main bag body 12 in response to air flow or suction through the bag 10. It will also be understood that when the bag is full, the bag may be readily removed from the cloth bag 56 mererly by releasing the spring closure ring 64 so as to move the latter downwardly to the position thereof illustrated in FIGURE 6 so as to release the open end 54 of the tunnel 14 from its engagement with the fitting 60. Thereupon the fitting can be separated from the tunnel entrance. In this connection, it will be noted that the valve constituted by the deflector 26–38 automatically returns to its closed position upon discontinuation of the air flow through the bag so that the dust filled bag can be readily removed from the cloth bag 56 without danger of discharging the contents thereof through the tunnel 14 due to the fact that the opening 72 is closed.

While the two mutually secured tongues 26 and 38 have been illustrated and described as constituting the combined deflector and valve, it will be apparent that it is within the scope of the present invention to utilize a single tongue only, either in the conduit 14 or the bag body 12, as the combined valve-deflector.

In view of the foregoing, it will be readily apparent that there has been illustrated and described a highly novel and efficient filter bag for a vacuum cleaner. While I have illustrated and described the presently preferred embodiment of my invention, it will be understood that various changes and modifications can be made therein without however departing from the inventive concept thereof, as set forth in the appended claims.

I claim:
1. A vacuum cleaner filter bag comprising a main elongated body formed of air pervious material, a tunnel for said main body, said tunnel having an open lower end for attachment to the air inlet conduit of the vacuum cleaner, said tunnel being closed at its upper end, said bag body being closed at both its upper end and its lower end, said tunnel and said bag body being secured together in wall to wall relation, said secured walls each having a flap defined therein which extends downwardly from the upper ends of said tunnel and bag body, and said flaps being secured together whereby said flaps are deflectable into said bag body in response to air flow into said tunnel.

2. A filter bag as in claim 1, said flaps each comprising an elongated tongue within the plane of the associated wall and being integral with the associated wall adjacent to the upper end thereof.

3. A vacuum cleaner filter bag comprising a main elongated body formed of air pervious material, a tunnel for said main body, said tunnel having an open lower end for attachment to the air inlet conduit of the vacuum cleaner, said tunnel being closed at its upper end, said bag body being closed at both its upper end and its lower end, said tunnel being mounted on the external surface of said bag body and being secured thereto in wall to wall relation, said secured walls each having a flap defined therein which extends downwardly from the upper ends of said tunnel and bag body, and said flaps being secured together whereby said flaps are deflectable into said bag body in response to air flow into said tunnel.

4. A filter bag as in claim 3, the lower end portion of said tunnel being free of securement to said main body.

References Cited
UNITED STATES PATENTS

| | | | |
|---|---|---|---|
| 1,827,496 | 10/1931 | Vanderwilt | 55—366 |
| 1,923,299 | 8/1933 | Darling | 55—367 |
| 2,039,741 | 5/1936 | Richards | 55—367 X |
| 2,336,584 | 12/1943 | Andrew | 229—62.5 |
| 2,577,863 | 12/1951 | Sosnowich | 55—376 |
| 2,672,213 | 3/1954 | Cropley | 55—381 |
| 2,710,072 | 6/1955 | Brace | 55—368 X |
| 2,782,934 | 2/1957 | Maysilles | 137—525 X |
| 2,995,205 | 8/1961 | Cordell. | |

HARRY B. THORNTON, *Primary Examiner.*

L. H. McCARTER, D. TALBERT, JR.,
*Assistant Examiners.*